United States Patent [19]

Schultze-Kraft

[11] Patent Number: 5,364,672
[45] Date of Patent: Nov. 15, 1994

[54] ARTIFICIAL STONES

[76] Inventor: Andreas Schultze-Kraft, Saarstrasse 11 D-6104, Seeheim-Jugenheim, Germany

[21] Appl. No.: 633,338

[22] Filed: Nov. 27, 1990

[51] Int. Cl.⁵ .............................................. B44F 9/04
[52] U.S. Cl. ..................................... 428/15; 428/256
[58] Field of Search ................ 428/15, 413, 703, 276; 156/61, 71

[56] References Cited

U.S. PATENT DOCUMENTS

| | | | |
|---|---|---|---|
| 2,951,001 | 8/1960 | Rubenstein | 428/142 |
| 3,396,067 | 8/1968 | Schafer | 428/15 X |
| 4,657,791 | 4/1987 | Ukkonen | 428/15 |
| 4,664,955 | 5/1987 | Clem | 428/15 |

FOREIGN PATENT DOCUMENTS 0187688  7/1986  European Pat. Off.

Primary Examiner—Henry F. Epstein
Attorney, Agent, or Firm—Wegner, Cantor, Mueller & Player

[57] ABSTRACT

Artificial stones from finely divided glass fragments and artificial resins and having a great similarity to natural stones under optical, weight-related and tactile-esthetical aspects consist of 15 to 30% by weight of a transparent cured or thermoplastically deformed synthetic resin which may be dyed, 10 to 80% by weight of white, green, brown or mixed fragmented and/or granulated waste glass of grain sizes of from 0.05 to 3 mm, 0 to 40% by weight of transparent, opaque or strongly colored fragmented and/or granulated new glass having grain sizes of from 0.05 to 3 mm,

0 to 75% by weight of transparent, opaque or strongly colored ground material having grain sizes of from 0.05 to 3 mm, produced from 80 to 92 parts by weight of waste glass having grain sizes of from 0.05 to 0.3 mm and 8 to 20 parts by weight of curable synthetic resin, 0 to 35% by weight of inorganic fillers selected from the group of silica sand, quartz meal, stone meal, natural or synthetic ground and/or granulated silicates having grain sizes from 0.05 to 3 mm, and 0 to 0.5% by weight of dyes and colored pigments.

9 Claims, 4 Drawing Sheets

ARTIFICIAL STONES

This application is a continuation-in-part under 35 USC § 120 and § 365 of PCT application Ser. No. PCT/EP 89/00565, filed May 23, 1989.

The present invention relates to artificial stones prepared from finely divided glass fragments and artificial resins which are of great similarity to natural stones in optical, weight related and touch-aesthetical aspects, to processes of producing same, and to the use thereof for making reproductions of art objects, arts-and-crafts articles, packages for luxury goods, decorative articles of daily use, cover plates for electric switches and socket, for the interior decoration of residential, administrative, representative eating establishments, kitchens, bathrooms, indoor swimming pool furnishings and intermediate products to be further processed by artists, art-craftsmen and do-it-yourselfers.

Artificial stones have been produced and long been used, above all, for the reproduction of art objects and for the decoration of walls and floors in the field of construction, where in general such artificial stones consist of a hydraulically setting binder and of various fillers which are different in sizes and different in colors. Generally such artificial stones are produced by a casting process and, when hardened, they may optionally be superficially after-treated, whereby the surfaces, more particularly, are subsequently smoothed, polished or provide with a protective layer. As the binders there are especially used gypsum, but also cement, Sorel cement and pozzolanically setting substances. However, with most of the artificial stones, one can tell generally on first glance that they are artificial stones, since they exhibit too little similarity to natural stones.

One typical process employing synthetic resins is described, for example, in the German Published Unexamined Patent Application (DE-OS) 19 12 466.

From the German Utility Model (DE-GM) 85 01 998 there has been known a plate-shaped structural element which consists of single-pane safety glass fragments and a binder such as epoxide resin. Since the material in the untreated condition has an uneven surface, it is usually ground to make it smooth after the binder has been cured.

It is the object of the invention to develop artificial stones which are of a great similarity to natural stones with respect to optical, weight related and tactile-esthetical properties and which can be reproducibly manufactured in a simple low-price non-polluting procedure and in a higher batch quantity so that they can be put to a great variety of uses and, more particularly, are suitable to meet even high standards.

It is intended that as great a variety as possible of natural stones be imitated, and more specifically those natural stones which have always been in use for the manufacture of art objects, arts-and-crafts articles, jewelry, articles of daily use and articles for a sophisticated interior decoration such as granite, sandstone, slate, basalt, alabaster, marble or jade. The surface of these artificial stones is to be formed as a relief having a filigree structure. The surface is further to correspond to surfaces of rubble stones and/or stone-carved reliefs. Also the mechanical stability of the artificial stones is to be comparable to that of the natural stones so that they may be exposed to comparable loads.

These objects can be attained in a surprisingly simple way by processing a mixture comprising from 15 to 30% by weight of a transparent curable or thermoplastically deformable synthetic resin which has been optionally dyed superficially or in bulk, and from 40 to 80% by weight of fragmented and/or granulated waste glass of grain sizes of from 0.05 to 3 mm as well as optionally further similar components in a pressing or casting procedure and, if desired, after-treating the surface of the product so that it assumes a rougher structure which may even be porous or may appear weather-worn. Depending on the kind of natural stone desired to be imitated, white, green, brown or mixed waste glass may be employed. It may also have been ground to different degrees of fineness and, if so desired, may consist of only selected sieve fractions of the fragmented and/or granulated waste glass. However, for reasons of stability some proportion of finely divided waste glass or finely divided other components should always be used. The particle sizes of all components should be within the range between 0.05 and 3 mm, the range between 0.1 and 2.4 mm being especially preferred.

As further components besides the waste glass, depending on the purpose chosen, from 0 to 40% by weight of transparent, opaque or highly colored splintered and/or granulated new glass having particle sizes of from 0.05 to 3 mm are used. Hereby it is made possible to achieve optical effects which are not achievable with the use of waste glass alone. In order to reduce or even to completely eliminate the proportion of new glass and to increase the proportion of old glass it is also possible to process waste glass, having a particle size of from 0.05 to 0.3 mm, with a curable plastic material to form an intermediate product which contains from 80 to 92 parts by weight of waste glass meal and from 8 to 20 parts by weight of cured synthetic resin. This material is ground to form a ground product having a particle size of from 0.5 to 3 mm and is employed in the place of the corresponding proportion of new glass and/or waste glass. If desired, the material may be pigmented or dyed. Since the technically very simple production of such colored ground material does not involve any energy-intensive melting operations, the use of material recycled from waste glass is to be preferred over use of that from colored new glass for reasons of costs and environmental protection.

One good example for the use of such ground material is the reproduction of granite structures. The "blue" Brazilian granite, e.g., which is extremely expensive in Europe, is composed of fairly translucent bright-gray, medium-gray and greenish as well opaque blue grains or crystals, respectively, which have sizes between 1 and 3 mm. While the greenish grains may be produced from green bottle glass and the gray ones may be produced from colorless waste glass meal in combination with a pigment binder and by the addition of bright quartz sand or grit, for the blue grains there may advantageously be used a ground material provided with an opaque-blue color in the place of an opaque blue glass.

With the ground material there is basically available a starting material which enables a reproduction to be attained true to nature with respect to color and translucency/opacity of virtually every rock crystal occurring in nature.

If an artificial stone contains a large amount of ground material (namely up to 75% by weight), the proportion of waste glass used in addition thereto can be lowered accordingly, i.e. to 10% by weight.

In order to achieve special effects and to imitate certain kinds of rock such as, for example, granite, there are added from 0 to 35% by weight of inorganic fillers from the group of quartz sand, quartz meal, stone meal, natural or synthetic ground and/or granulated silicates having grain sizes from 0.05 to 3 mm. Finally, from 0 to 0.5% by weight of dyes and/or colored pigments may be incorporated. In order to achieve special optical effects, it is not necessary that the dyes and color pigment form an entirely homogeneous mixture and thus the striations, veins and color shades observed in natural stones may be imitated.

The subsequent change of the surface may be effected, for example, by superficially dissolving or swelling the artificial resin component and then coating the resulting surface with an especially fine glass powder or another inorganic filler. Upon evaporation of the solvent, the remainder of the fine coating only loosely adhering to the surface may be removed therefrom by blowing compressed air thereon, so that a fine surface coating is formed which has been applied by adhesion. With the use of unsaturated polyester resin types which are largely resistant to chemicals, this procedure must be effected at a stage wherein the synthetic resin has not yet been cured completely.

However, use of most types of unsaturated polyester resins, the step of superficially dissolving may even be completely omitted, if the artificial stone molded article is demolded at a stage as early as possible, i.e. at a time when it already has the dimensional stability required for demolding, while, however, the polymerization process itself has by no means been completed. At this stage the surface is still sufficiently tacky for holding the glass meal and/or stone meal applied by means of compressed air. The artificial stone having thus been surface-treated must then be allowed to be complete cured (after-cured) by keeping it in a chamber having an elevated air temperature (50° C. to 80° C.) for the appropriate period of time.

Furthermore it is also possible to subsequently provide the surface with a decorative surface cover which has a porous and weather-worn appearance, especially by including in the casting operation for the outermost layer or pressing into the outermost layer a grainy water-soluble component which optionally may have been dyed or pigmented, which component subsequently can be washed out with water. As the water-soluble grainy component there may be employed, for example, rock salt, sugar and other water-soluble granular substances which can be subsequently leached out with water and then, as the occasion will arise, due to the reaction of the dyes or colored pigments added thereto, striated discolorations will be caused to occur.

Further very interesting embodiments of the artificial stones may be formed by producing them from several layers of different compositions which first are distinguished by their appearances, but, if so desired, also by their mechanical stabilities. Then, such artificial stones and/or articles made of artificial stones, respectively, consist of a stable support layer and a less stable decoration layer bonded thereto. It is further possible to provide the reverse side and/or inner side of such artificial stones with a flat or hollow shape and optionally to reinforce them with fiber materials such as glass fibers and/or metal wire-mesh webs, for example steel wire-mesh reinforcement.

Thus, the present invention relates to artificial stones from finely divided glass fragments and artificial resins, characterized in that they are of a great similarity to natural stones in optical, weight-related and tactile-esthetic properties and that they consist of from 15 to 30% by weight of a transparent cured or thermoplastically deformed synthetic resin which, if so desired, may have been dyed superficially or in bulk, from 10 to 80% by weight of white, green, brown or mixed splintered and/or granulated waste glass of grain sizes of from 0.05 to 3 mm, from 0 to 40% by weight of transparent, opaque or highly dyed fragmented and/or granulated new glass having grain sizes of from 0.05 to 3 mm, from 0 to 75% by weight of transparent, opaque or highly dyed ground material having grain sizes of from 0.05 to 3 mm, produced from 80 to 92 parts by weight of waste glass having grain sizes of from 0.05 to 0.3 mm and from 8 to 20 parts by weight of curable synthetic resin, from 0 to 35% by weight of inorganic fillers selected from the group of quartz sand, quartz meal, stone meal, natural or synthetic ground and/or granulated silicates having grain sizes from 0.05 to 3 mm, and from 0 to 0.5% by weight of dyes and/or colored pigments, wherein the surface has been shaped by means of a pressing or casting operation as a relief having a filigree structure, which corresponds to surfaces of rubble stones and/or stone-carved reliefs or the surface comprises a surface-adhesive fine coating subsequently applied thereon or the surface comprises a decorative surface cover which has been subsequently produced and is of a porous and weather-worn appearance.

The invention further relates to the process for producing artificial stones from finely divided glass fragments and artificial resins which are of a great similarity to natural stones in optical, weight-related and touch-esthetic aspects, characterized in that a mixture comprising from 15 to 30% by weight of a transparent curable or thermoplastically deformable synthetic resin which, optionally, has been dyed superficially or in bulk, from 10 to 80% by weight of white, green, brown or mixed fragmented and/or granulated waste glass of grain sizes of from 0.05 to 3 mm, from 0 to 40% by weight of transparent, opaque or highly dyed fragmented and/or granulated new glass having grain sizes of from 0.05 to 3 mm, from 0 to 75% by weight of transparent, opaque or highly dyed ground material having grain sizes of from 0.05 to 3 mm, produced from 80 to 92 parts by weight of waste glass having grain sizes of from 0.05 to 0.3 mm and from 8 to 20 parts by weight of curable synthetic resin, from 0 to 35% by weight of inorganic fillers of the group of quartz sand, quartz meal, stone meal, natural or synthetic ground and/or granulated silicates having grain sizes from 0.05 to 3 mm, and from 0 to 0.5% by weight of dyes and/or colored pigments, is shaped by means of a pressing or casting operation, and thereby the surface is shaped as a relief having a filigree structure, which corresponds to surfaces of rubble stones and/or stone-carved reliefs or that the surface is subsequently provided with a surface-adhesive fine coating or that soluble components are subsequently leached out from the surface to produce a porous and weather-worn appearance.

Finally the invention relates to the use of artificial stones according to the invention for making reproductions of art objects, arts-and-crafts articles, packages for luxury goods, decorative articles for daily use, cover plates for electric switches and sockets, for the interior decoration of residential, administrative, representative and eating establishments, kitchens, bathrooms, indoor swimming pool furnishings and intermediate products to be further processed by artists, art-craftsmen and do-it-yourselfers. Due to the good adhesion of suitable synthetic resins to wood, glass, concrete and to various synthetic materials, the artificial stones of the invention may also be bonded to these materials.

It is further possible to provide the artificial stones of the invention with weather-resistant layers. Boards made therefrom may also be employed as material for outdoor construction work.

Thus, an essential constituent of the artificial stones of the invention, in addition to the curable or thermoplastically deformable synthetic resin composition, above all is ground and/or granulated waste glass. This is available in sufficient amounts and may be successfully re-used by means of the process of the invention in a non-polluting procedure which does not require any large amounts of energy. Due to the use of curable or thermoplastically deformable synthetic resins it is possible to process the artificial stones by casting or pressing methods and thereby to prepare said artificial stones much more similar to natural stones with respect to the surface structures thereof than any artificial stones known so far. According to the invention even extremely fine filigree structures can be represented which conform to natural rubble stone surfaces as well as to stone-carved reliefs. The transparent opaque highly dyed fragmented and/or granulated new glass is employed only in the amount necessary for attaining particular effects. The inorganic fillers optionally added selected from the group of quartz sand, quartz meal, stone meal, natural or synthetic ground and/or granulated silicates in general are available in large amounts and at a low price, so that the costs of the raw materials for the artificial stones of the invention will mainly depend on the synthetic resin employed.

As the synthetic resins suitable for use in the pressing (compression molding) process, there may be used, for example, thermoplastically deformable transparent synthetic resins. A drawback inherent to the deformable transparent synthetic resins is that the artificial stones made therefrom may again undergo deformation when heated at some elevated temperature. Therefore, it is preferred to employ synthetic resins which are curable and retain their shape also when heated. The thermal stressability of the artificial stones of course will be lost at those temperatures where the synthetic resins are thermally decomposed. Under this aspect the artificial stones according to the invention are not comparable to imitated natural stones. However, this is in general irrelevant to the intended uses. It should nevertheless be noted that also some of the natural stones utilized for artists' works such as marble and alabaster are not much thermally stressable.

Thus, as the curable synthetic resins which are excellently processable in a casting operation there are used epoxy resins and polyester resins. In most cases the resin content is in the range of 20% by weight; however, the amount of the synthetic resin may be varied within the broad range of from 15 to 30% by weight, depending on the desired aesthetic feel, the required mechanical stability and the particular composition of the fillers.

For subsequently applying the adhesive fine coating to the surface, the finished compression-molded or cast artificial stones are sprayed with a suitable atomized organic solvent such as acetone or alcohol and are then dusted with glass meal and/or stone meal having a particle size of less than 0.1 mm. With use of UP resin types which are largely resistant to chemicals, this operation must be carried out at a stage when the synthetic resin has not yet been completely cured. After the tacky phase has ceased, the excess amount or the amount of the glass or stone meal just weakly bonded to the surface is removed by the action of compressed air. Thus, upon use of a fragmented glass meal the material is provided with crystal-like surface fine structure which is visible and touchable and makes the material appear very rare. In order to subsequently provide the surface with a structure which looks porous and weather-worn, the surfaces of the casting mold are first sprayed with a water-soluble adhesive agent. Then, crystals or granules of a water-soluble material such as salt or sugar are adhesively placed thereonto, which crystals or granules may also be pigmented to exhibit suitable color shades. Once the stone base composition has been cast into the mold and hardener, the water-soluble crystals or granules are leached out, preferably with a water jet, whereupon the dye or the color pigment mixed to a pulp remains partially adhered to the synthetic resin. The result is a non-uniform porous surface of the artificial stone which stands out in some shades and in total gives some weather-worn impression. Further attractive surface effects may be achieved by the water-soluble particles not being quickly leached out, but being caused to slowly effloresce and only completely removed thereafter. Also surface structures are thus formed which are more frequently observed on natural stones and rocks.

Thus, it is one essential characteristic of the invention that by the way of forming the surface for the first time the fine structures as well as the coarse structures can be reproduced of rock materials of kinds as different as marble, alabaster, jade, onyx, granite, basalt, sand-stone, variegated sandstone or slate extremely true to nature.

The general optical impression of a natural rock surface results from the individual items of optical information through the factors set forth hereinbelow, which the reproduced stone should be able to provide:

a) Grain size

Each of the rock materials mentioned, on somewhat closer inspection, shows that its structure is composed of a multitude of grains and/or crystals. These may be extremely fine as in slate or rather coarse as in granite. They may also be different in size as in marble streaked with quartz veins.

By grinding of waste glass fragments to form the respective sieve fractions (as a rule within a margin of from 0.1 to 3 mm), glass particles having the required sizes may be produced. As to the shapes thereof, they are hardly distinguished from the corresponding rock particles.

b) Translucence/opacity

The various kinds of rocks, at the particle level, are distinguished with respect to the translucence thereof. Whereas slate, basalt and—if observed without a microscope—also sandstone appear to be absolutely opaque, it may be observed, e.g. with some grades of granite, that part of the grains is translucent to light like opal.

Some light-transmittability is even typical for jade, onyx and alabaster.

For the artificial stone made of waste glass—which normally is transparent—any desired degree of translucence down to an absolutely opaque material is realizable by admixing the binder with the appropriate amounts of opacifying pigments.

c) Color

When observing the color of the stone there will have to be differentiated between the general impression, the color composition under the gross-structural aspect, and that in the fine-structural range. The latter is of crucial importance for the manufacture from waste glass of artificial stones looking similar to natural rock.

The color composition in the fine-structural region may be controlled as desired. This is effected by designed harmonization of the mixing ratio and the arrangement between colorless and/or green and/or brown waste glass particles and optionally new glass particles or preferably particles of ground material with the pigmentation of the binder and, optionally, the addition of minor amounts of stone meal, quartz meal or quartz sand to provide a pastel effect.

Thus, for example, colorless and green waste glass particles will logically form the main components in reproducing jade, and so will colorless and brown waste glass particles for reproducing onyx, while the pigmentation of the binder will serve to correct the color and to opacify, if desired.

d) Rock structure

To be differentiated is here between the uniform grain structure (e.g. in slate), the homogeneous grain mixture (sandstone), the non-uniform grain mixture or distribution (granite), the spot- and streak-marbled appearance (marble), the vein and stria structure (marble, alabaster) and the layer structure (variegated sandstone, onyx), while several of these different types of structure may also occur in one and the same kind of rock.

A stone reproduction intended to be assessed by natural rock standards will not only have to reproduce those structures with respect to the colors thereof, but it will also have to take into consideration the structural differences with respect to the particle size structure and any translucence or opacity as occurring selectively at points or partial areas.

In the production of artificial stones according to the invention from waste glass, these demands are met in the various phases of the production:

in the designed composition of the waste glass and other filler particles which, if desired or required, may be clearly distinguished with respect to grain sizes, colors and/or translucence/opacity thereof, in blending said particles with the binder which has been purposefully pigmented with a view to color and translucence/opacity to form castable compositions, in the subsequent step of blending two or more mixtures, in equally divided or unequally divided portions and optionally incompletely, to form so-called blend combinations, by the mechanism of simultaneous and/or alternating and/or position-changing addition of two or more blend combinations into the casting mold.

In an automated continuous production of artificial stone panels or other shaped articles the material mixing and feeding systems are to be designed with respect to the arrangement and mechanics so that the structural characteristics of the various kinds of rocks can be reproduced true to nature.

e) Surface structure

Natural rock stones worked by a stone-mason traditionally have a surface structure which is either broken-rough, ground, optionally even polished or optionally provided with stone-cut reliefs. Due to the excellent formability properties of the artificial stone material of the invention, all of these structures may be perfectly reproduced by remodelling original natural rocks.

The question of whether the actual forming of the artificial stone is to be effected by the casting method or the compression-molding method is to be answered in response to the circumstances. It is of particular importance with a view to the claimed reproduction of natural rock material structures true to nature. Also the production costs play a role. Pressing effected at a relatively high pressure—e.g. on a stamping machine—has the advantage that a very high amount of filler and an accordingly low amount of binder may be employed. The mass to be press-molded is filled into the compression mold in a lumpy partially still dry powdery condition. The high pressure of compression then causes the binder to be uniformly distributed between the filler particles. In the preparation of the above-mentioned ground material as a material, which has a very highly homogeneous finely divided structure, such a compression molding process will be used with advantage.

However, this process is less suitable for the production of artificial stones which are very similar to natural rocks: Due to the half-dry state of the mass to be compressed it fails to offer sufficient opportunity of reproducing differentiated rock structures such as striata, shades, marbled appearance, veins or layered composites. On the other hand, such a compression molding operation can be effected only by a use of very expensive metal molding tools. The chances for varying the surface structures of the artificial stones in a great multiplicity of possible ways would be subjected to considerable restrictions due to the costs involved. This fact would result in a uniformity of the surface appearance which is not encountered in natural rocks.

In the casting process, the synthetic resin-filler mixtures are placed in the mold when still in the castable highly viscous state. In the course thereof several mixtures which are different in their particle size compositions, translucence/opacity and color shade may be simultaneously and/or alternatingly combined. Depending on design, direction of motion and working rhythm (or arhythm) of the mechanical devices causing the combination of the mixtures, hereby natural rock structures such as striata, marbled appearance, shading or a layered structure may be imitated. Moreover, e.g. by an irregular spray application of a thin liquid mixture contrasting in color on two highly viscous cast strands being combined immediately prior to hitting the mold, vein structures may be produced which have a high resemblance to those of natural rocks.

However, one prerequisite for the availability of such a potential of structural design is the sufficient flowability of the casting compositions employed. This is accomplished, for example, by the use as a binder of a unsaturated polyester resin having a very low viscosity, or by the deliberate temporary non-use of the largest possible filler saturation of the casting composition. Thereby also a deaeration of the casting composition filled in the mold is facilitated, i.e. the removal—which may optionally be supported by a vibrator device—of air bubbles formed by stirring during the addition entrapped on the mold surface.

Due to the fact that the specific weight of the filler is distinctly higher than that of the binder, there will occur some densification of the filler which will even be enhanced by optional vibration. The filler particles will settle in downward direction, whereby the resulting filler saturation in the lower part of the mold will become essentially higher than that in the upper part.

The material should not be allowed to remain in such a condition, for reaction resin with low filler levels undergo upon curing a significantly higher reduction in volume (shrinkage) than those having high filler levels. This would result in inadmissible tensions occurring in the composite materials which, e.g., would cause curved deformations in plate-shaped castings. For this reason it will be generally required to refill the poorly filled upper portion of the casting composition with dry filler. This is best effected by sprinkling fragmented waste glass having a particle size of at least 1 mm therein In order to quickly overcome the surface tension of the casting composition, the material should be sprinkled down from a sufficient height. The densification of the filler added by sprinkling is supported by simultaneously shaking the mold with a vibrator device. The sprinkling addition is to be continued until the casting composition has been filled with the sprinkled material to such a degree that the latter cannot sink down any more and a dry surface of glass particles is formed which have only been half embedded in the binder.

By the combination of the casting procedure with the subsequent refilling the mix by sprinkling additional filler a degree of saturation with filler of up to 85% by weight may be achieved without any problem.

Due to the advantageous optical properties and performance of the artificial stone material of the invention and the low cost of raw materials and energy, the mass production of plate-shaped construction elements made of such materials is of a particular importance. These include floor plates and tiles, wall and swimming pool tiles, indoor and outdoor window-sills, facade boards, clinker and brick panels as well as table, bar, counter and working plates. Such panel-shaped structural members may be advantageously produced on a continuously working and fully automated endless molding belt plant. Here the casting composition—which as a rule has been combined from different blends—comprising fillers, binders and dyes is applied on an endless moving conveyor belt which simultaneously serves as the molding tool or casting die. The surface of this belt has a structure which as a negative corresponds to the desired surface structure of the artificial stone panel. The length and speed of advance of the circulating molding belt is to be adapted to the reaction of the UP resin employed as the binder with the appropriately metered additions of the curing agent, accelerator and inhibitor. By including a heating tunnel in the belt cycle, the curing process may be accelerated and, thus, the length of the belt required can be reduced. At an advance speed of 2 m/min of the belt and use of a highly reactive UP resin as the binder, a working length of about 60 m between the introduction and the removal of the material into the mold and from the mold, respectively, can be assumed as a guiding figure. The mold release, i.e. the separation from the molding belt of the artificial stone solidified by polymerization is effected as soon as the artificial stone has attained the dimensional stability required therefor. Immediately thereafter the web of artificial stone is cut into large panels. In order to finally cure same, they are then passed to an after-curing storage which comprises an elevated air temperature. The fully hardened large panels may then be saw-cut to the desired formats.

In such a unit for producing artificial stone panels bearing a high resemblance to natural stone, the criteria and components as referred to in the following are of particular importance and, hence, in the entirety thereof are relevant to the invention:

a) Mixing of the material components.

The material mixing system combines the principle of batch mixing with that of a continuous flow mixing. In the stage of batch mixing, as far as the synthetic resin is concerned, first a low-viscosity unsaturated polyester resin (e.g. VESTOPOL ® 155) is pre-accelerated with a suitable reaction accelerator (e.g. cobalt solution in styrene). Also now tert-butylcatechol may already be added as an inhibitor, if required for affecting the subsequent time of processing and curing. The unsaturated polyester resin having thus been preaccelerated and optionally been provided with the inhibitor additive has a pot life at room temperature of several weeks. As far as the filler is concerned, first one or, as a rule, several filler combination(s) comprising waste glass particles of different particle sizes and colors and optionally also new glass or preferably also ground material particles of different particle sizes, colors and translucence/opacity, and optionally stone meal, quartz meal or quartz sand are formulated. The resulting filler combinations are then blended in separate mixing vessels with the UP resin having been pre-accelerated and optionally been provided with the inhibitor additive. The fluid compositions now formed are then as a whole or in partial amounts introduced into so-called dyeing mixers. In these, pigments having the desired color shades and having been dissolved in styrene are added to the compositions in the required doses.

After the above procedure the transition into the continuous mixing stage takes place. The dyed blends are withdrawn in controlled flow amounts from the dyeing vessels and passed into flow mixers. In these, the reaction-initiating curing agent (e.g. methyl ethyl ketone peroxide) is added in the required dose. After this operation the pot life of the resulting mixtures only amounts to a few more minutes. Now the mixtures are united or combined into several groups and introduced into one or more so-called structural mixers wherein, by means of suitable mechanical systems, they are combined to give the desired natural rock-oriented structural effects. Upon the use of two or more structural mixtures, the final unification of the pre-combined mixtures is carried out in a hopper tub also equipped with a mechanical marbling system. From here the material is directly applied to the molding belt, e.g. by means of a doctor knife.

b) The material of the molding belt.

In the conventional technology of polymer concrete and polymer artificial stones, the following mold materials are generally employed:

If processed in the hot-pressing procedure: Steel.

If processed in the casting procedure: Panels of synthetic products such as RESOPAL®, HORNITEX®, FORMICA®, pressed boards, planed boards, aluminum or steel sheet having a smooth surface, or molds of glass fiber-reinforced cured polyester. Casting molds made of any of these materials will have to be treated with a suitable release agent prior to casting.

Said materials are not suitable for the continuous production according to the invention of artificial stone panels which are very similar to natural rock on an endless belt unit. What is required here is rather a flexible material which can be mounted on an endless circulating steel belt. The material must further ensure the perfect model-copying of, if required, extremely fine filigree surface structures of natural rock surfaces or also stone-carved reliefs and it should work without being previously treated with a release agent. Such a material, in fact, is available; thus, certain types of silicone rubbers recently developed, (e.g. Wacker RTV-2 silicone rubber VP 7524 or RTV-M 531 or the improved successor type thereof which has not yet been introduced on the market), meet the requirements of the present intended use and, more specifically, exhibit an increased resistance to polyester. The utility thereof is favored by the fact that the reactive aggressivity occurring during the polymerization of unsaturated polyester resins highly filled with glass particles is significantly lower than that encountered with unfilled unsaturated polyester resins. While the temperature increase induced by the reaction of unfilled unsaturated polyester resins may lead to material temperatures of up to 150° C., in the production of the artificial stone material according to the invention there was only used a temperature increase to from 30° C. to 35° C. The production of molding belts made of silicone rubber is not complicated. To this end, negative castings of silicone rubber in the required multiplicity are made from a panel-shaped natural rock model (e.g. in the format of 2 m×2 m). These mold members, once cured, are adhesion-bonded with each other by means of a suitable vulcanizing adhesive (e.g. ELASTOSIL(®)) to form an endless continuous belt having the required length. The reverse side of the resulting belt is reinforced by vulcanizing a supporting cloth thereonto. Such a mold belt ensures a use life of at least 1,000 molding operations.

c) Influencing the surface properties.

Depending on the intended use, the artificial stone panels to be produced are demanded to have certain surface properties such as, e.g., increased abrasion and scratch resistance of floor tiles and working panels, weather-resistance of facade panels, resistance to chemicals of swimming pool tiles, soil-repellency of wall tiles etc. Since, as a rule, a standard type UP resin available at reasonable costs is to be used, it is to be understood that the panel-shaped artificial stones in some individual cases will have to be provided with a fine layer which purposefully comprises the surface properties demanded in the respective case. Such fine layers may have been based on a UP resin system which has been deliberately adjusted or furnished to serve its purpose. However, the use of suitable polyurethane systems or of other synthetic coating materials is also basically possible.

The application of a fine layer (which as a rule is between 0.2 and 0.4 mm in thickness) will appropriately be effected not after molding the pre-cured panels, but as a so-called "in-mold-coat" prior to introducing the casting composition into the mold. To do so, the fine layer is sprayed on the silicone rubber mold immediately in the beginning of the cycle of the circulating belt. In order to accomplish some optical or tactile effects, a very fine waste glass powder may be simultaneously blown into the spray jet. In this manner, the surface hardness and the abrasion resistance may also be enhanced. If the viscosity of the fine layer resin—which should be solvent-free if possible—would render a spray application impossible, then the fine layer resin—which may optionally have been reinforced with waste glass powder—may also be applied by doctor knifing or roller application. Since it is desirable that not too much of the length of the mold belt is sacrificed for the fine layer coating step, the fine layer material is to be formulated so that it will begin to react quickly, while its gelation may optionally be accelerated by the action of heat. Once gelation has begun to take place, the casting composition forming the actual artificial stone can be applied using a doctor knife.

d) Combination with other materials.

The artificial stone material of the invention is very suitable for combination. Fully cured artificial stone panels can be trouble-free and durably bonded by means of suitable adhesives or adhesive cements to concrete, stone, wood, metal, ceramic and other materials. For certain uses it may be advantageous to integrate the combination with other materials already in the manufacture of the panel-shaped artificial stones. Thus, e.g., wall panels having a heat-insulating property may be produced with advantages on the described endless molding belt unit. In this case the filler-densified casting composition will not be fully refilled by sprinkling waste glass therein, but instead a low-filled material having a thickness of from 2 to 3 mm is left on the upper side (reverse side of the panel). Then into this wet layer there are allowed to sink or pressed under a low pressure suitable lightweight building plates (HERAKLITH(®)) or unwound glass wool mats (ISOVER(®)). In the course thereof the low-filled reaction resin penetrates into the openings and pores of the plates or mats. Once the polymerization has taken place, the materials have been inseparable bonded to each other.

BRIEF DESCRIPTION OF THE DRAWINGS

The attached

Figures

Figure 6:
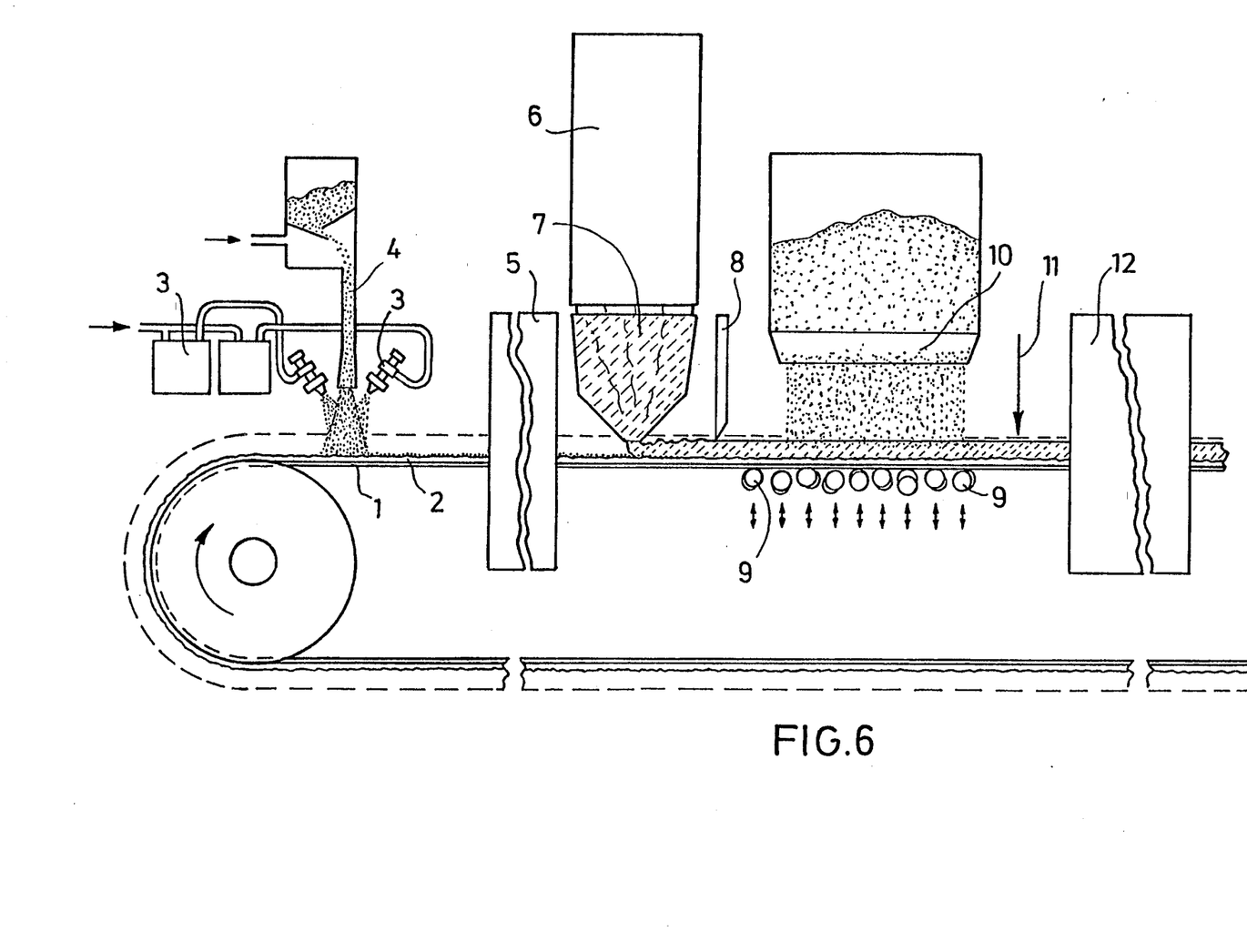
FIGS. 6 and 7 show the design of an endless molding belt unit for producing artificial stone panels which are very similar to natural rock material from waste glass.
Figure 7:
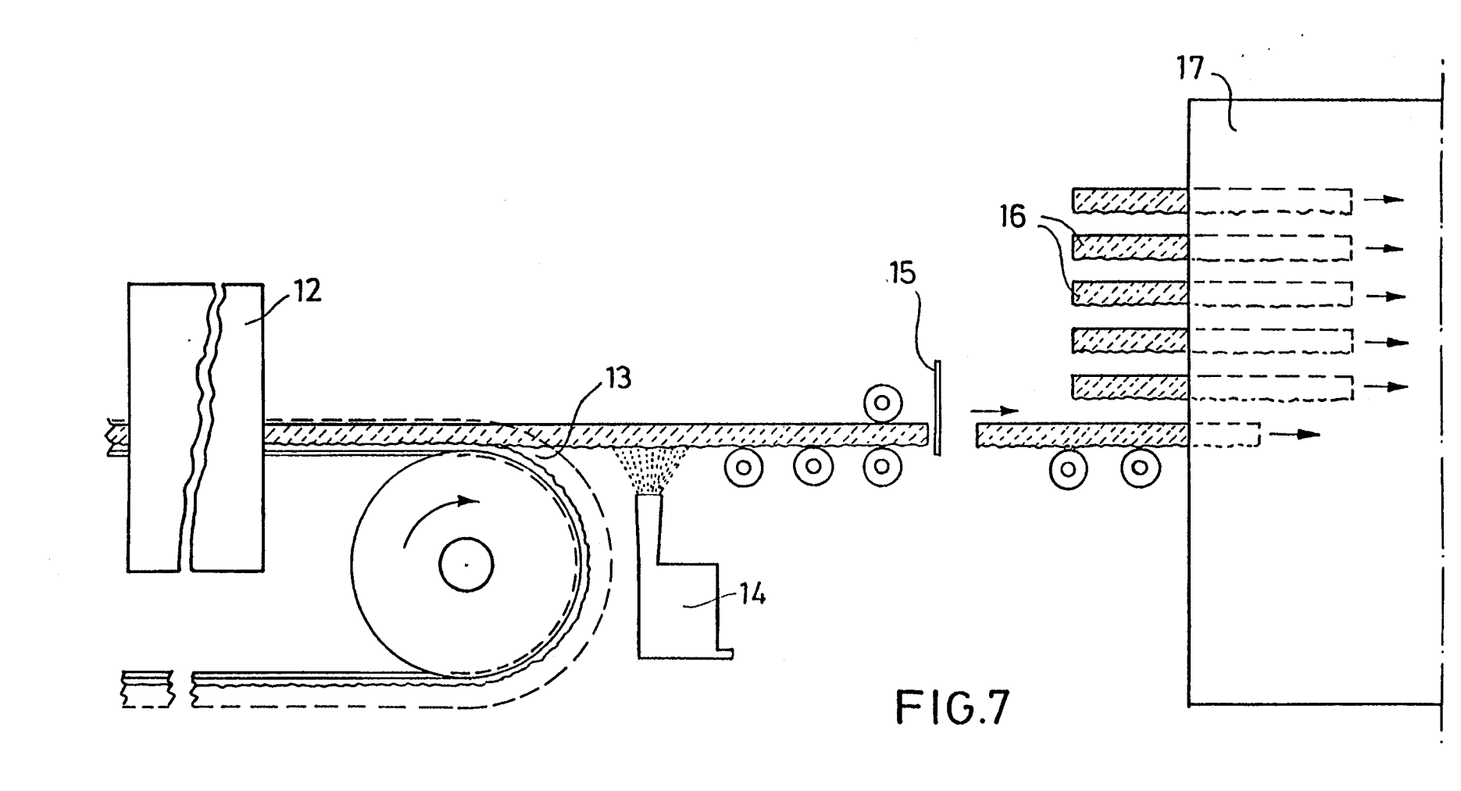

The reference numerals denote the following parts of the plant:

1 Circulating steel band
2 Silicone-rubber molding belt mounted thereonto and comprising a backing reinforcement cloth
3 Spraying device including an external addition of hardener for the surface fine layer
4 Glass powder addition by a stream of air
5 Heat tunnel for accelerating the fine layer reaction
6 Casting composition blending and combination unit
7 Hopper tub
8 Doctor knife or doctor knife system
9 Shaking section for de-aerating and filler densification
10 Sprinkling device for filler replenishing
11 Position for a possible combination with lightweight building plates or glass wool mats
12 Heat tunnel for accelerating the curing procedure 13 Automatic mold release
14 Adhesive surface fine coating with dry stone or waste glass meal
15 Cutting device
16 Aerated shelf stacking
17 After-curing in the heated store The subsequent Examples exhibit some typical artificial stones, and the process for producing same and the use thereof will be illustrated in greater detail.

Example 1: Granite

Figure 1:
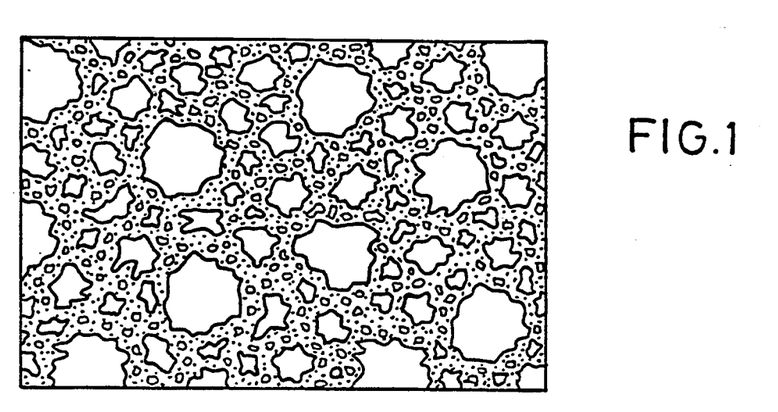
FIG. 1 shows an imitation granite of example 1.

To imitate a greenish/gray granite, a mixture containing anthracite-gray opaque glass fragments of the particle sizes of <0.5 mm, on the one hand, 0.5 to 1.0 mm and some isolated grains having a size of from 1.0 to 2.4 mm is mixed with medium-grey opaque glass fragments having grain sizes of <0.5 mm and from 0.5 to 1.0 mm. Then, glass fragments of green bottle glass and having grain sizes of <0.25 mm and <0.5 mm may be employed. Further added are glass fragments of colorless bottle glass having the grain sizes of from <0.5 mm to 1 mm and isolated grains on an order of magnitude of from 1.0 to 2.4 mm. The blend is admixed with 20% by weight of a low-viscosity reaction resin. The structure of the resulting artificial stone is schematically shown in the attached FIG. 1, while, due to the presence of the binder component, the surface is well suitable also to represent some filigree-like unevenness of the casting mold. If desired, the casting mold may have been formed by using a natural stone as model.

Once the cast object has been completely cured, some acetone is sprayed onto the surface thereof, and then glass meal of a particle size of <0.1 mm is sprinkled thereover, wherein a colorless and/or a green bottle glass may be employed. After the evaporation of the solvent, the excess of glass is removed with an air jet. As is evident from FIG. 1, the artificial stone obtained, like natural granite, exhibits in part a rather coarse granularity. Therefore, this material, similar to natural granite, is only of a limited resistance to break and a limited mechanical stressability. To improve these mechanical properties, a second reinforcing support layer is cast onto the reverse side of the finished artificial stone which does not contain any coarser material and optionally has an extremely high breaking strength. In said support layer there is exclusively used the inexpensive waste glass.

Example 2: Sandstone

Figure 2:
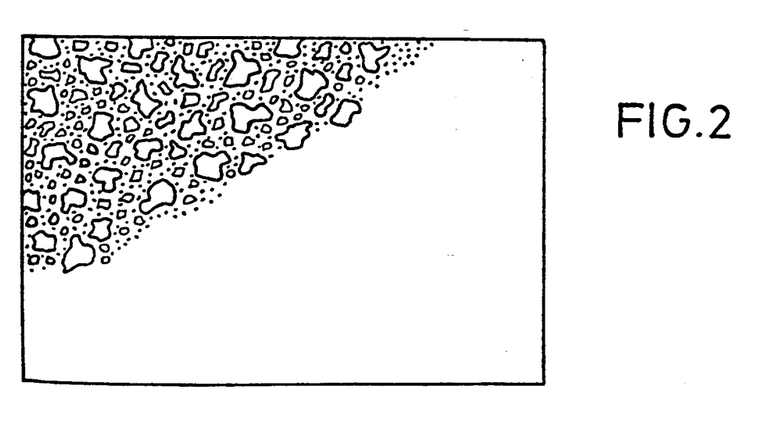
FIG. 2 shows an imitation sandstone of example 2.

To imitate a reddish-ocher sandstone, brick-red opaque glass fragments having the particle sizes of <0.25 mm, <0.5 mm and from 0.5 to 1 mm are mixed with glass fragments of brown bottle glass of the particle sizes <0.5 mm and from 0.5 to 1 mm and further with glass fragments of colorless bottle glass having the particle sizes <0.1 mm, <0.25 mm and <0.5 mm. Then, 20% of a light-transparent reaction resin are provided with 0.2% of a reddish-ocher pigment, and the total mixture is cast as described in Example 1. Due to the relatively fine granularity and the high proportion of waste glass, the resulting artificial stone is mechanically essentially more stable and for reasons of the price may also be cast to have higher thicknesses, so that a two-layer composite structure will not be necessary. The structure of this artificial stone is schematically illustrated in the FIG. 2.

Since natural sandstone surfaces tend to become weather-worn, this artificial stone may also be provided with a surface structure of a weather-worn appearance by previously applying rock salt grains into the casting mold and subsequently leaching out these rock salt grains, while by an application of pigmented salt even particular striata formations may be created.

Example 3: Slate

Figure 3:
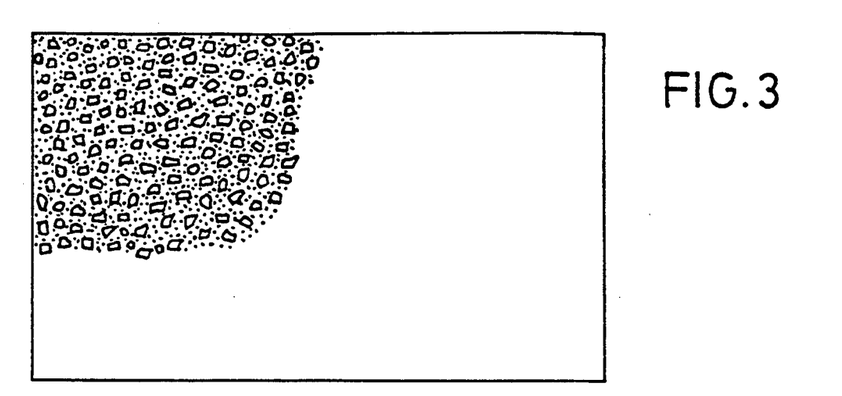
FIG. 3 shows an imitation slate of example 3.

To imitate a slate, glass meal of a green bottle glass of the particle sizes <0.1 mm and <0.25 mm is mixed with a glass meal of a brown bottle glass of the particle sizes <0.1 mm and <0.25 mm and with a synthetic resin intensely pigmented with an anthracite pigment and cast. To impart a surface especially true to nature to the resulting slate, the surface again is sprayed with some acetone and sprinkled with a glass meal having a grain size of <0.1 mm, which after setting is largely removed therefrom by means of compressed air. Another possibility consists of sticking natural slate meals to the surface instead of the fine glass meal. The structure is schematically shown in FIG. 3.

Example 4: Light-transmitting alabaster

Figure 4:
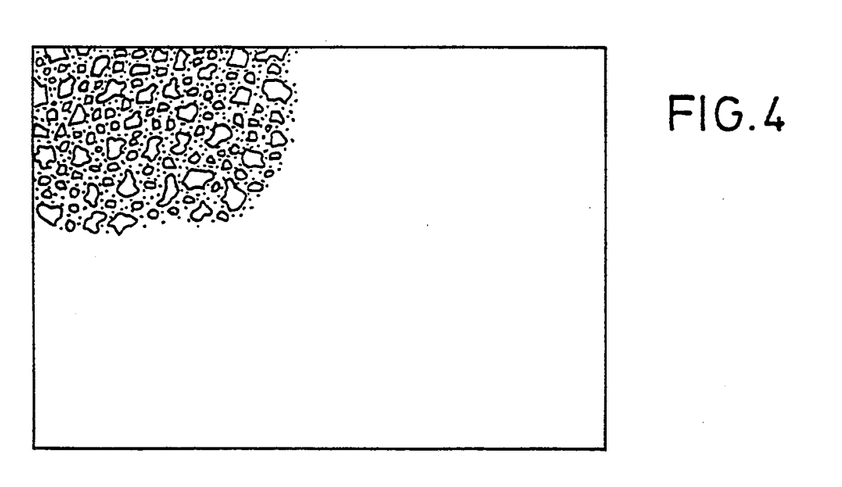
FIG. 4 shows an imitation alabaster of example 4.

To imitate a greenish alabaster which is translucent to light, glass fragments of green bottle glass of the particles sizes of <0.1 mm, <0.25 mm and <0.5 mm are mixed with glass fragments of green new "alabaster glass" of a particle size of <0.1 mm and glass fragments of colorless bottle glass having the particles sizes of from <0.1 to 0.5 mm, and a slightly milky pigmented synthetic resin is added thereto. This mixture is cast as described above. The thinner the wall of an article made of such a composition has been shaped, the higher is the translucency. Articles having thicker walls but nevertheless a good translucency to light are obtained by a two-layer structure. Here first the decorative layer is prepared as described above, and then the support layer is made exclusively from a synthetic resin which is as clear as possible and has been bonded and pigmented exclusively with colorless bottle glass particles. The structure is schematically shown in FIG. 4.

Example 5: Amber-colored onyx having a layered structure

Figure 5:
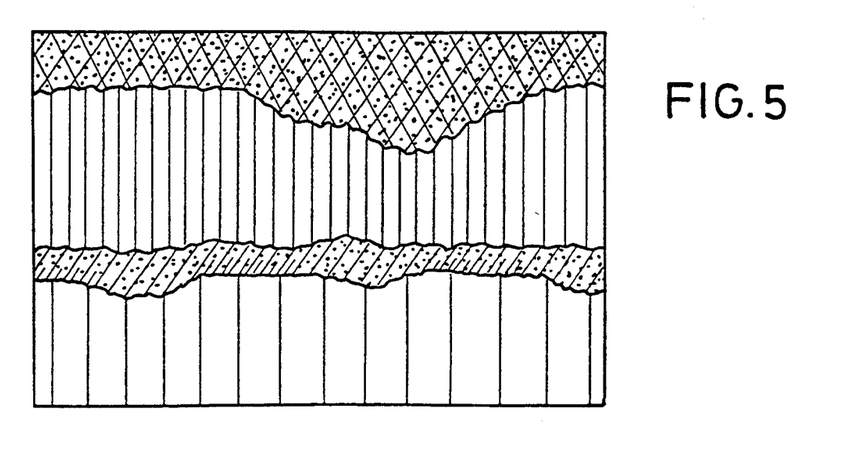
FIG. 5 shows an imitation onyx of example 5.

To imitate such a material, a multi-layered structure is necessary. This structure is shown in the attached FIG. 5. Layer 1 is hardly translucent, cream-colored and has a relatively coarse granular structure. Layer 2 is of medium translucency, of an amber color and does not exhibit a grain structure visible with the naked eye. Layer 3 is hardly translucent, greenish-cream-colored and in some zones has a coarse granular structure with increased translucency. Layer 4 is highly translucent, bright-amber in color and does not exhibit any perceivable grain structure. These layers are prepared as described above and cast one onto the other. Thereby a product is formed which has a very genuine and valuable appearance, the price of which, however, is higher than that of a mono-layered material, due to the various procedures to be employed.

Example 6: Thin large-size panel made of a coarse-grained colored granite

The visually recognizable grain sizes of the natural rock model are between 1 and 3 mm, the grain colors are bright gray, greenish and lapis lazuli blue. The spectrum of the degrees of the translucence/opacity reaches from opal-like translucent to absolutely opaque. The coarsely structured pattern of the rock formation is veined over large areas, where sometimes one color and sometimes some other different color is dominant in the non-uniformly distributed spots and striata.

a) Preparation of a ground material.

First, intermediate products are produced by the compression process from colorless and green waste glass meals of the grain sizes of from 0.05 to 0.3 mm with the addition of pigment to accomplish the desired color shades and degrees of the translucence/opacity. As the binder there is employed an unsaturated polyester resin. The ratio of amounts of filler/binder in these pressed initial products is 90 to 10. The strand-shaped initial products, when cured, are ground in differently colored batches to form ground materials having particle sizes of from 1 to 3 mm. Then the individual batches of the colored ground materials are mixed to form mixed batches of ground materials, wherein the mixing ratios are variable with respect to the proportions of colored constituents so that in each of said mixed batches one of the color shades mentioned may be more or less dominant.

b) Manufacture of the final product.

The above-described mixed batches are mixed in a final ratio of from 50 to 65% by weight of ground material with from 30 to 15% by weight of colorless waste glass meal having particle sizes of from 0.05 to 0.5 mm and with 20% by weight of a low-viscous UP resin prepared to be quickly hardening. The resulting mixtures are combined by means of a mechanical system for final mixing and/or casting over a large area and producing non-uniform veins and striata and are applied, e.g. by means of a doctor knife, onto a casting mold. Thereby a colored granite reproduction is obtained which consists of waste glass in an amount of about 80% and is hardly to be distinguished from the natural rock original which with respect to its stone structure, whereas it has substantially superior strength properties compared to a natural colored granite saw-cut to a thin plate of the dimensions of 1 m $\times$ 1 m $\times$ 0.006 m.

I claim:

1. Artificial stones from finely divided glass fragments and artificial resins, characterized in that they are closely similar to natural stones in terms of optical, weight-related, touch, and aesthetic properties, wherein said stones comprise
   from 15 to 30% by weight of a transparent cured or thermoplastically deformed synthetic resin,
   from 10 to 80% by weight of fragmented waste glass of the grain sizes from 0.05 to 3 mm, and
   up to 0.5% by weight of dyes or colored pigments.

2. The artificial stones according to claim 1, characterized in that the close similarity to natural stones is achieved by fragmented colored waste glass selected from the group consisting of white, brown, green, and mixtures thereof.

3. The artificial stones according to claim 1, characterized in that their surface has been shaped by means of a pressing or casting operation to simulate the surface of treated or untreated natural stones.

4. The artificial stones according to claim 1, characterized in that they comprise at least two layers of different colors.

5. The artificial stones according to claim 1, characterized in that they comprise at least two layers of different grain structure.

6. The artificial stones according to claim 1, characterized in that they comprise at least two layers, one of which is a support layer and one of which is a decoration layer.

7. The artificial stones according to claim 1, characterized in that they have a flat surface.

8. The artificial stones according to claim 1, characterized in that they have a surface which is reinforced with fiber material or metal wire-mesh webs.

9. The artificial stones according to claim 1, characterized in that they have a surface treated with a weather-resistant coating for outdoor use.

* * * * *